(12) United States Patent
Bieber

(10) Patent No.: US 6,357,316 B1
(45) Date of Patent: Mar. 19, 2002

(54) SHIFTING DEVICE FOR PINION GEAR CHANGE BOXES

(75) Inventor: Gerold Bieber, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/601,755

(22) PCT Filed: Apr. 3, 1999

(86) PCT No.: PCT/EP99/02303

§ 371 Date: Aug. 7, 2000

§ 102(e) Date: Aug. 7, 2000

(87) PCT Pub. No.: WO99/53224

PCT Pub. Date: Oct. 21, 1999

(30) Foreign Application Priority Data

Apr. 11, 1998 (DE) .......................... 198 16 385

(51) Int. Cl.⁷ ..................... F16H 63/20; F16H 63/30; F16H 63/36
(52) U.S. Cl. ................. 74/473.24; 74/473.21; 74/473.1
(58) Field of Search ............ 74/337.5, 473.21, 74/473.24, 473.37

(56) References Cited

U.S. PATENT DOCUMENTS

| | | | | |
|---|---|---|---|---|
| 3,857,299 A | * | 12/1974 | Morrison | 74/473.21 |
| 4,335,623 A | | 6/1982 | Kronstadt | 74/477 |
| 4,377,951 A | | 3/1983 | Magg et al. | |
| 4,472,868 A | * | 9/1984 | Takahashi | 74/473.37 |
| 4,621,537 A | | 11/1986 | Piazza et al. | 74/477 |
| H295 H | | 7/1987 | Numazawa et al. | 74/473 |
| 4,856,362 A | * | 8/1989 | Jester | 74/473.24 |
| 5,018,404 A | * | 5/1991 | Muller | 74/473.24 |
| 5,285,694 A | * | 2/1994 | Chene | 74/473.24 |
| 5,970,815 A | * | 10/1999 | Buerger | 74/473.24 |

FOREIGN PATENT DOCUMENTS

| | | |
|---|---|---|
| DE | 25 47 476 | 3/1977 |
| DE | 30 00 577 C2 | 1/1983 |
| DE | 43 09 861 C1 | 10/1994 |
| EP | 0 395 241 | 10/1990 |
| EP | 0 532 924 A2 | 3/1993 |
| GB | 1186791 | 4/1970 |
| GB | 2 026 109 A | 1/1980 |

* cited by examiner

Primary Examiner—David A. Bucci
Assistant Examiner—William C Joyce
(74) Attorney, Agent, or Firm—Davis & Bujold, P.L.L.C.

(57) ABSTRACT

A shifting device (1) for pinion gear change transmissions which actuates the positive fit couplings by selector forks (3, 21) that slide on a stationary longitudinal guide (2). Shifting forces are transmitted from the shifting finger (9) to the selector forks (3, 21) by profiled metal plates (4, 5, 6) suspended in the selector fork (3, 21), the other end of the plates is guided in a switching comb (7) and the automatic locking device for blocking non-shifted gates and gears and gear selection is actuated via the locking plates (11) and sliders (16). The configuration of the inventive shifting device (1) makes it possible to provide a reliable, simple, low-costing shifting device suitable for various types of shifting mechanism such as lever shifts, turning-shaft shifts, cable and hydrostatic shifting mechanisms and automation modules.

9 Claims, 4 Drawing Sheets

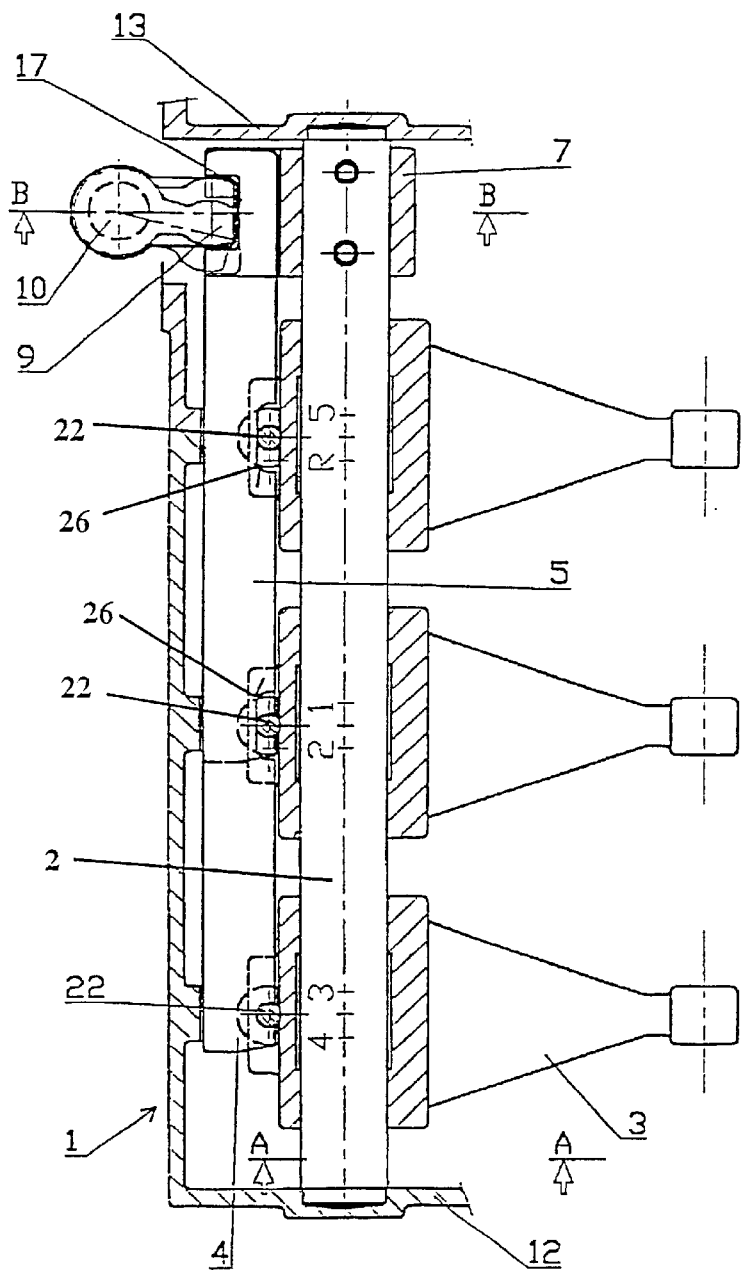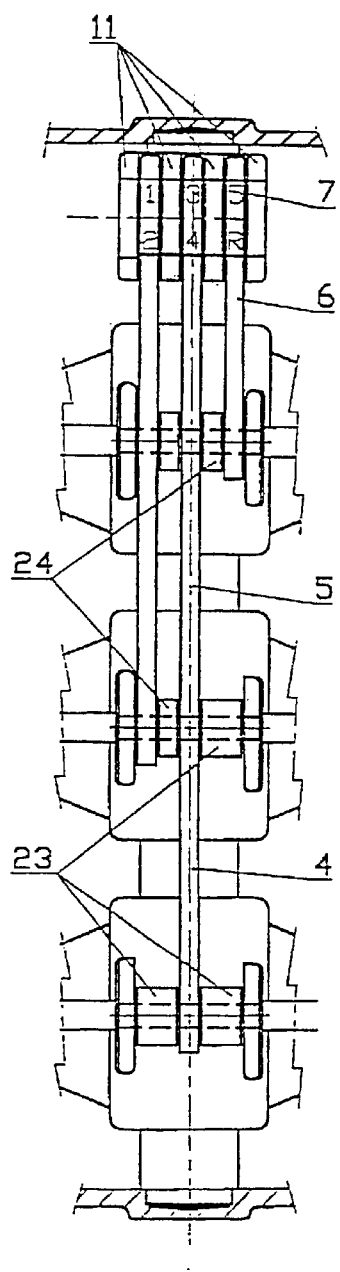
Fig. 1
Fig. 2

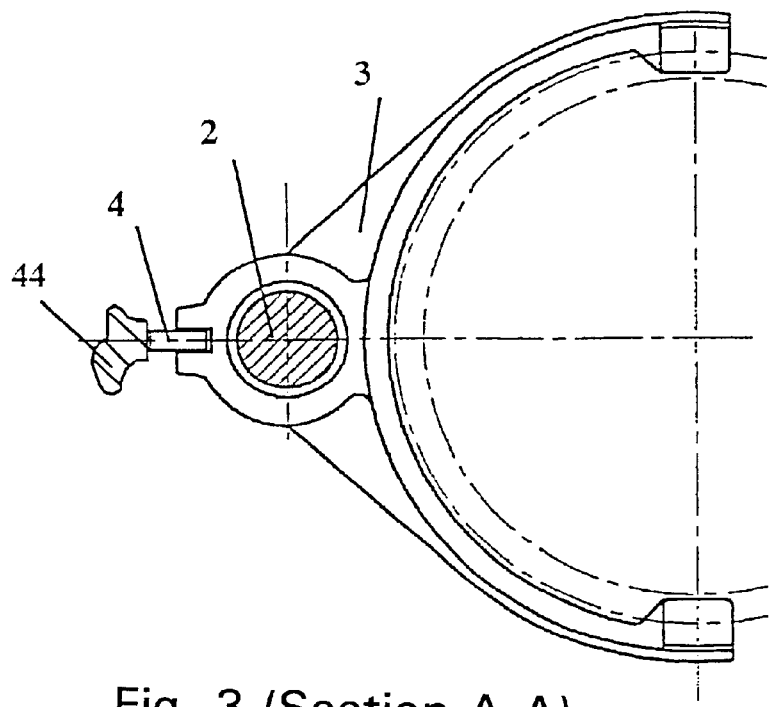
Fig. 3 (Section A-A)
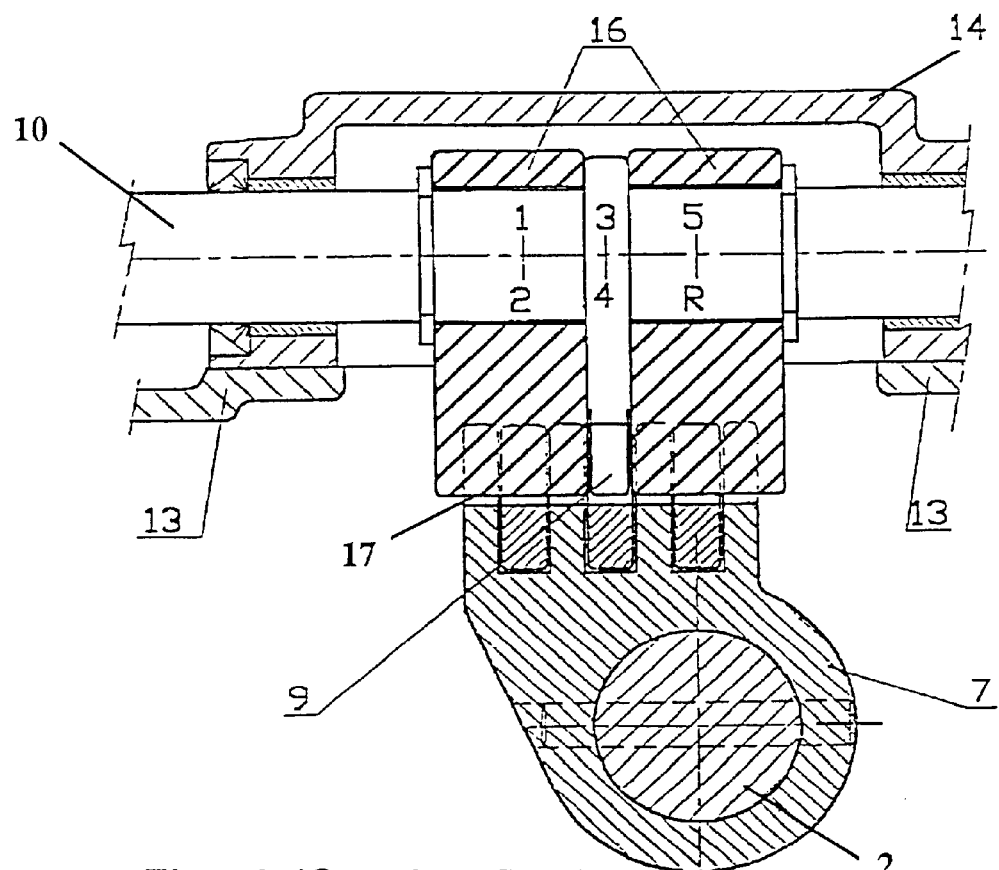
Fig. 4 (Section B-B)

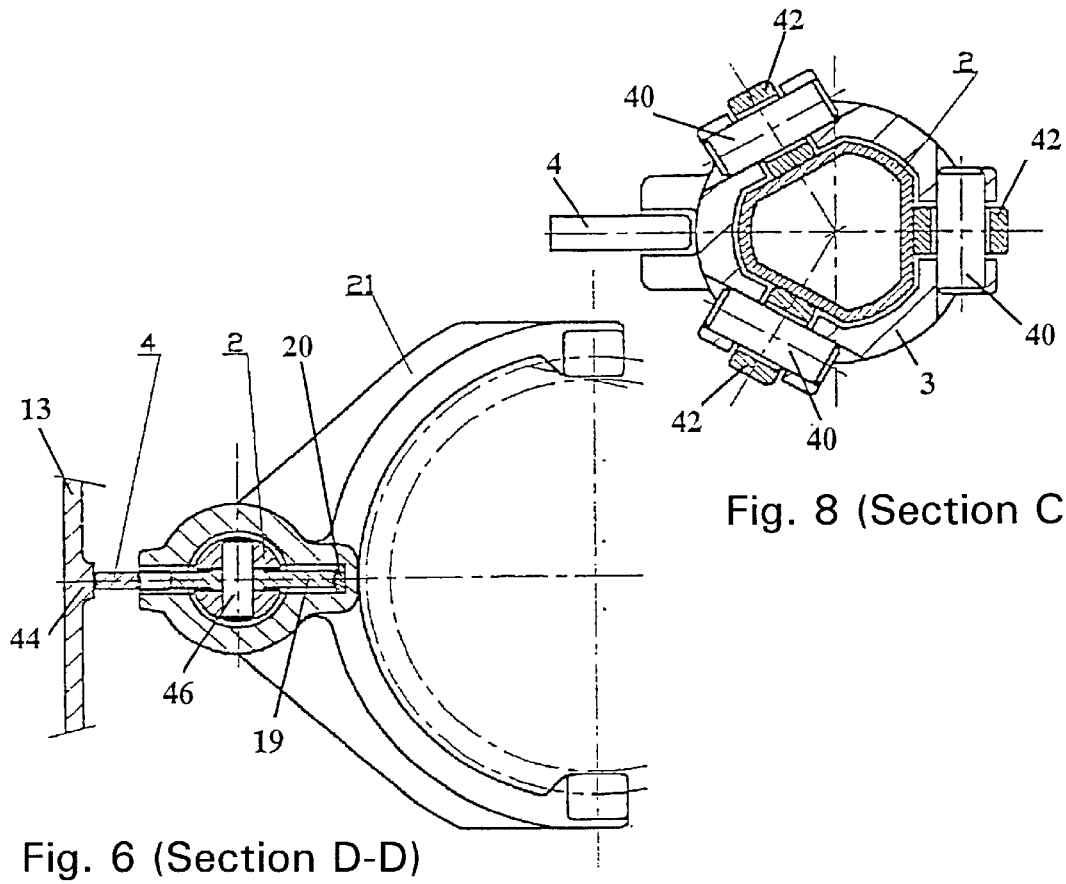
Fig. 8 (Section C-C)
Fig. 6 (Section D-D)
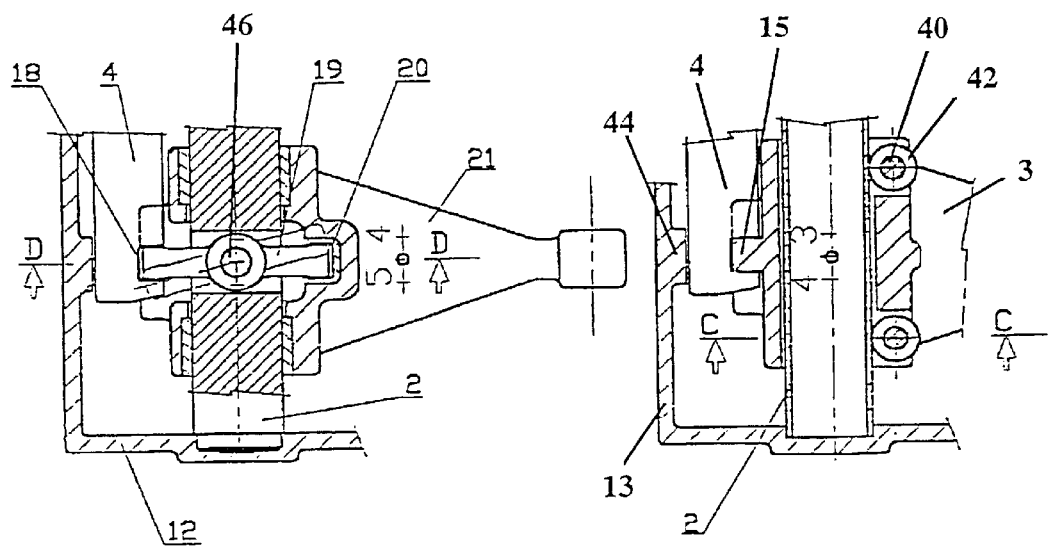
Fig. 5
Fig. 7

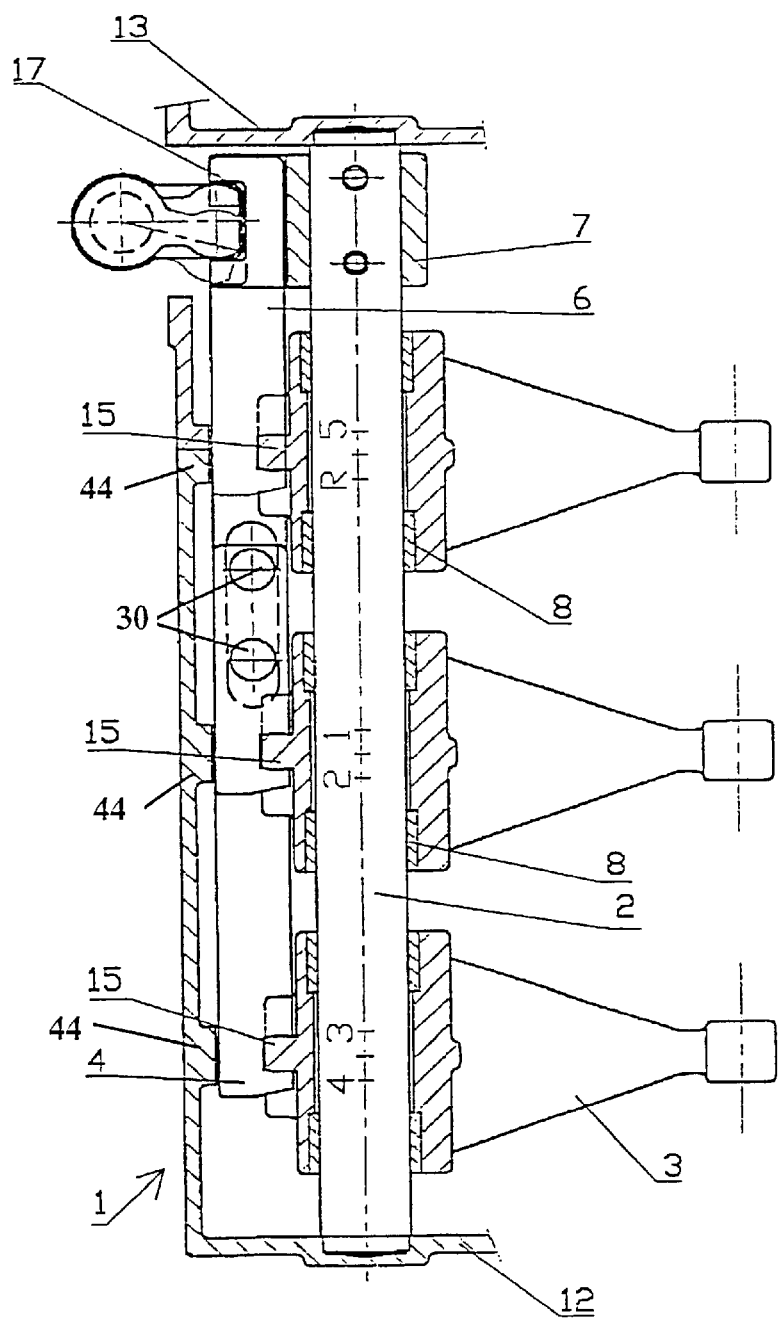
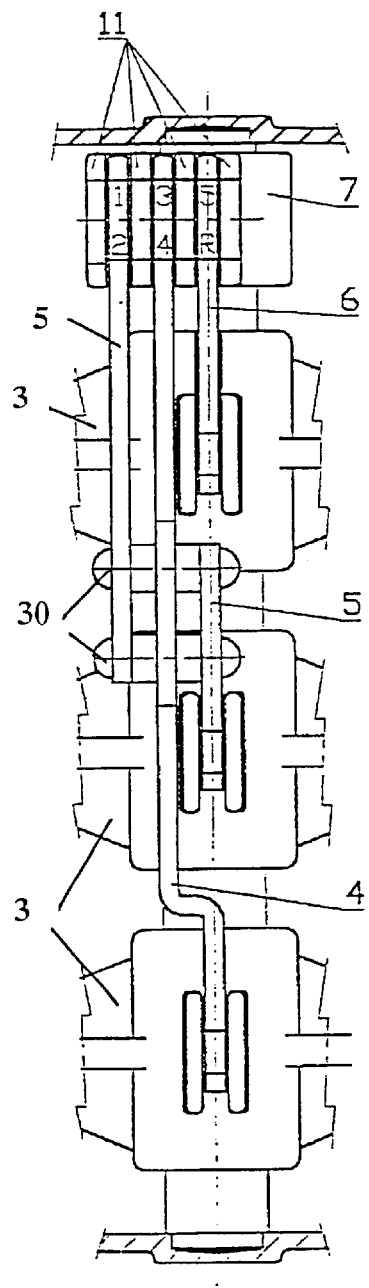
Fig. 9
Fig. 10

SHIFTING DEVICE FOR PINION GEAR CHANGE BOXES

The invention relates to a shifting device for pinion gear change transmissions.

BACKGROUND OF THE INVENTION

To shift pinion gear change transmission, selector forks are used, as a rule, in order, by means of transmission devices, to transmit shifting movements from a shift lever to the positive-fit couplings of the transmission. The shifting movements are transmitted to the shift lever according to known H gear shift patterns. The transmission device must have few transmission losses and small volume and be well damped to ensure the shifting comfort required in modem vehicles. It must reliably prevent the possibility of several gears being simultaneously actuated. One other function is the conversion of the shifting movement on the shift lever (path and force) to the path and force needed by the arrangement of the positive-fit couplings on the output shaft and/or countershaft and the configuration thereof in the form of dog clutch control or synchronizer units.

Shifting devices of this kind can be divided in the following sub-groups:

Selector forks for transmitting the shifting force to the sliding sleeves of the positive-fit couplings. The positive-fit couplings, often synchronized, are as a rule disposed on shafts of the transmission and selectively connect pinions with the shafts. Selector forks transmit the shifting force to the sliding sleeves by sliding bearings. This requires a wear-resistant material. To keep the weight and costs low, selector forks are often made of die-cast aluminum or compound material and in place of the low-friction bearing is a sprayed molybdenum or provided with crossheads shoes. In the gear shift mechanism with a central shifting rail proposed, e.g. in U.S. Pat. No. 4,621,537, the gate selection and gear shift demand precise machining and hardened edges directly on the selector fork. This requires different costly selector forks made of malleable cast iron. Another disadvantage of this design is the many low-friction bearing places between central shifting rail and selector forks which mainly when cold can lead to tough selection and shifting.

Longitudinal guides for transmitting the shifting force to the selector forks. Two basic principles are known:
  a) rails firmly connected each with one selector fork. The rails slide in the transmission housing and transmit only forces in the longitudinal direction. There are rails made of pipes, round steel, or as stamped or bending parts.
  b) a central rail which slides in the transmission housing and transmits longitudinal and rotational movement. All selector forks slide on the rail. The choice of which selector fork is to be coupled with the shifting rail for shifting and the locking of the non-actuated selector forks in this neutral position in longitudinal direction are effected by shaped and locking parts between shifting rail and selector forks.

Gates and gear shift make possible the selection of the gate in which lies the desired gear and the shifting of the gear by moving the shift lever. Three basic principles are known:
  a) selection and locking between the central rails and the selector forks such as shown in EP 0 395 241. At the same time, strict requirements are imposed on the selector forks in relation to precise machining and strength of the material. This results in expensive machining and great weight. Many friction places generate which can have a negative effect upon the shifting comfort.
  b) selection of the desired shifting rail by shifting finger or lever fastened upon a separate selection shaft. The gears are locked by separate means such as pins and balls or pawls between the selector forks and shifting rails. This type is often used in pinion gear change transmissions of passenger cars and light industrial vehicles.
  c) selection and locking by a so-called switching comb. The switching comb consists of several flat segments of which alternatively one is connected with a selector fork and one firmly connected with the housing in shifting direction. The shifting finger that slides through said switching comb can only actuate the desired gear when its position coincides in shifting direction with the flat segment of the selector fork. In other positions, the selector forks remain locked. Such a shifting system is shown by way of example in DE 30 00 577 C2. The shifting device is often used in transmissions of commercial vehicles.

Connection of different switches and sensors to indicate the transmission situations (for ex., neutral position reverse gear, etc.).

Connection of different selector units. For different vehicles different selector units are used such as lever shifts, turning-shaft shifts, cable-controlled and hydrostatic shifting mechanisms. To make possible installing on a pinion gear change transmission different selector units, a unitary interface must be obtained between pinion gear change transmission and selector units.

Due to movements of the sliding sleeves or jerks on the vehicle the shifting parts can be excited in a manner such that an engaged gear trips during the drive. To prevent this, the shifting parts of each gate are fixed by means of spring-loaded detents in the "neutral" and "gear in" positions. This constitutes an added expense, since a separate detent of the positions again takes place in the selector unit.

It is often necessary in pinion gear change transmissions to construct different ratio series, so-called high gear or direct gear designs. Here the low-loss direct lock-up clutch, e.g. in a 5-gear transmission is the $4^{th}$ gear in the high gear transmission and the $5^{th}$ gear in a direct gear transmission. This requires, e.g. a reversal of shifting direction of the selector forks concerned. In shifting systems with central shifting rail, this is not possible and in shifting systems with several shifting rails, it involves substantial cost. The change of the gear shift pattern, e.g. for right-hand and left-hand steering, is also very expensive in the gear shifts with central shifting rail.

The problem on which the invention is based is to indicate a gear shift device which makes possible that the selecting and shifting forces are transmitted with low friction, reliably and economically between different selector units and the sliding sleeves of the separating clutch. The device should offer simple possibilities of designing gear shift for direct and high gear transmissions and different gear shift patterns, and a clear modulation of the gear shift sections.

The problem is solved with the shifting device for pinion gear change transmissions of the present invention.

SUMMARY OF THE INVENTION

In the inventive shifting device, all selectorforks are guided by means of a longitudinal guide firmly connected with the housing parts and actuated by profiled metal plates sliding on said mechanism. The profiled metal plates slide on their other end into a switching comb fastened upon the longitudinal guide and having locking plates as teeth. Between the teeth a shifting finger and an automatic locking device are displaced by shifting means and either interact with the profiled metal plates for shifting the gear or block with the locking plates the non-shifted gates and gears.

In an advantageous embodiment, the longitudinal guide has a profile in the shape of a triangle which consists of a rolled or drawn metal pipe.

In another advantageous embodiment, the selector forks are made of die-cast aluminum or compound material and the guide between the longitudinal guide and the selector forks is integrated directly in the selector fork.

In another advantageous embodiment, the selector forks have plugged-in low-friction bearings.

In another advantageous embodiment, the selectorforks have rollers as longitudinal guide.

In another advantageous embodiment, the profiled metal plates are fixed in shifting direction with the selector forks by means of driver pins and the position of the profiled metal plates in selecting direction is determined by means of spacer discs.

In another advantageous embodiment, the profiled metal plates are connected with positive fit with the selector forks by means of lugs and their position in selecting direction is obtained by outward begins and passages of the profiled metal plates.

In another advantageous embodiment, the selector forks have beneath the longitudinal guide pockets in which mesh the levers supported in the longitudinal guide, the other end of which levers meshes in pockets of the profiled metal plates to reverse the movement of the profiled metal plates.

In another advantageous embodiment, the switching comb is formed in selecting direction alternatively by locking plates and profiled metal plates fixed in shifting direction and in which pockets are situated through which in selecting direction slide the shifting finger and the automatic locking device.

The selector forks are made, e.g. of die-cast aluminum and slide on a longitudinal guide. They have sliding faces which for the actuation of the sliding sleeves are sprayed, e.g. with molybdenum. The longitudinal guide can have different profiles. It can also be part of the transmission housing, since its only function is to guide the selector forks. The sliding bearing of the selector forks on the longitudinal guide can be of different kinds. A specially simple and low-cost solution is a steel pipe drawn and inserted in the transmission housing and holes for guidance into the selector forks. If special requirements are imposed on easy motion, low-friction bearings or all kinds of longitudinal roller bearings between selector forks and longitudinal guide can be advantageously used. When the sliding sleeves have equal mating dimensions, the same selector forks can be used for all or several gears. By virtue of the longitudinal guide no outwards openings are formed in the transmission housing. This reduces the danger of leakage. It also can be advantageous, e.g. to place on the longitudinal guide bolts of the transmission housing.

The selector forks have cams or pins in each of which are profiled metal plate is plugged in or suspended. The profiled metal plate leads by one end to the so-called switching comb where the gear is selected. The non-actuated gears can be locked in a reliable and simple manner by an alternative arrangement of locking plates and profiled metal plates in the switching comb. By means of the profiled metal plates, it is possible to change the sequence of the selector forks in the transmission and also to align them relative to different shafts to determine the sequence of the gear shift pattern. It is thus possible to design the selector forks in the sequence 4–3, 2–1, R–5 and the gear shift pattern with 1–2, 3–4 and 5–R.

If it is needed to reverse a selector fork, one profiled metal plate is fastened upon the lever instead of upon the selector fork. The lever is supported in the longitudinal guide and by its other end actuates the particular selector fork sliding on the longitudinal guide.

Across the profiled metal plates slides a sliding member which is moved in selecting direction by the shifting finger.

Between each profiled metal plate in the switching comb, if there is placed, fixed to the transmission housing in shifting direction, one locking plate in which slides the sliding member, then all non-selected gears are fixed in their neutral position in an easy and economical manner. If the profiled metal plates are situated directly side by side without locking plates, it is also possible to use the known locking means (pins, balls, pawls).

The "neutral" and "gear-in" fixing occurs only in the selector unit. This is possible since non-shifted gears are fixed by the sliding member. The cushioning of the neutral position is moved in the shifting unit in order to be able better to respond to the different requirements of the respective selector unit and to the customer's desires. For the above reasons, the cushioning of the gate is also displaced in the selector unit.

It is particularly advantageous with regard to the assembly to fasten the switching comb on the longitudinal guide. Thereby it is possible separately to assemble and adjust the complete shifting system in order then to use it as module in the assembly of the transmission. The position of the switching connection is changeable mainly to be able to react to the conditions of the vehicle in lever shifts. To a great extend, this is possible due to the different shapes of the profiled metal plates.

BRIEF DESCRIPTION OF THE DRAWINGS

The invention is described in detail with reference to the drawings. By way of example is shown the shifting system of a 5-gear transmission with a standard gear shift pattern and a selector fork arrangement 4–3, 2–1, and 5–R. In the drawings:

FIG. 1 is a section through a shifting system of a pinion gear change transmission along the longitudinal guide;

FIG. 2 a view from above of the selector forks, profiled metal plates, longitudinal guide and the switching comb of FIG. 1;

FIG. 3 is a selector fork along a section A—A in FIG. 1;

FIG. 4 is the switching comb and the selector shaft along a section B—B in FIG. 1;

FIG. 5 is a selector fork with integrated shift reversal;

FIG. 6 is the selector fork of FIG. 5 in cross section along a section D—D.

FIG. 7 is a roller bearing of a selector fork;

FIG. 8 is the selector fork of FIG. 7 along a section C—C;

FIG. 9 is the arrangement of FIG. 1 with a different design of the connection between selector forks and switching comb; and FIG. 10 is a view from above on the selector forks, profiled metal plates, longitudinal guide and the switching comb of FIG. 9.

DESCRIPTION OF THE PREFERRED EMBODIMENTS

A longitudinal guide 2 firmly fastened between the housing parts 12, 13 of a shifting device 1 of a pinion gear change transmission guides the selectorforks 3 in a longitudinal direction. As shown in FIG. 1, the profile of the longitudinal guide can be round. Other profiles can also be used for the longitudinal guide. Thus, FIG. 8 shows, by way of example, a triangular profile of a drawn steel part. The control of the selector forks 3 for the gears 4+3, 2+1 and R+5 can be directly integrated in the selector forks or, as shown in FIG. 9, result by means of low-friction bearings 8. For a specially low-friction shifting system, different roller bearings are possible. A possible design is shown in FIG. 7 and FIG. 8. Longitudinal guides, such as used for drawers in the manufacture of furniture, can also be used.

Shifting force is transmitted between switching comb 7 and selector forks 3 through the profiled metal plates 4, 5 and 6, see FIG. 2. Each profiled metal plate is suspended on a driver pin 22 of the corresponding selector forks 3 and slides in pockets 26 on the pins 22 of the remaining selector forks. By means of spacer discs 23, 24 which have different widths is determined the position of the profiled metal plates 4, 5, 6 relative to the selector fork 3 and to the switching comb 7. The profiled metal plates 4, 5, 6 are designed so as to be on their other end guidable by a switching comb 7. In each profiled metal plate 4, 5, 6 is situated one pocket 17 in such a manner that the shifting finger 9 can slide thereinto. The shifting finger 9 sits firmly upon the selector shaft 10 and is moved by the shift lever (not shown) in order to select the gates and is rotated in order to shift the gears. In the locking plates 11 of the switching comb 7 equal pockets are also provided which are situated between the profiled metal plates 4, 5, 6 at the sides thereof.

FIG. 3 shows a selector fork 3 along a section A—A in FIG. 1. The selector fork 3 is placed upon the longitudinal guide 2 and is actuated by the profiled metal plate 4. A projection 44 on the housing 13 secures the position of the profiled metal plate 4.

FIG. 4 shows the switching comb 7 and the longitudinal guide 2 along a section B—B in FIG. 1. A slider 16 slides between the pockets 17 of the profiled metal plates 4, 5, 6 and the switching comb 7 and is moved in the longitudinal direction by the shifting finger 9 or the selector shaft 10. The selector shaft is rotatable and axially movably supported in the housing. The slider 16 is supported upon the selector shaft 10 rotatably relative to the sector shaft 10 and axially fixed relative to the selector shaft 10. The slider 16 for its part fixes the non-actuated profiled plates 4, 5, 6 and therewith the selector forks 3 in a neutral position in the shifting direction. The pockets 17 of the locking plates 11 of the switching comb 7 which are stationary in the shifting direction prevent, in association with the slider 16, the shifting finger 9 from simultaneously actuating several gears. Friction or other effects from the positive-fit couplings, selector forks or profiled metal plates cannot result in any undesired movement of the selector forks. The shifting finger 9, the selector shaft 10 and the slider 16 are advantageously situated in a selector unit 14 separately from the housing 13 and the selector unit 14 is then connected with the transmission housing 13.

FIG. 5 shows a selector fork 21 with an integrated selector toggle. When for different ratio series the reversal of a selector fork becomes necessary, the profiled metal plate 4 is not situated directly on the selector fork 21 but on a lever 19 which meshes in a pocket 18 on the profiled metal plate 4. The lever 19 is rotatably supported in the longitudinal guide 2 around one bolt 46 and by its other end actuates the selector fork 21 that slides upon the longitudinal guide 2 meshing in a pocket 20 in the selector fork 21. The direction of movement of the profiled metal plate 4, relative to the direction of movement of the selector fork 21, is reversed via the lever 19.

FIG. 6 shows the selector lever 21 of FIG. 5 in cross-section along a section D—D. The same structural parts show the same reference numerals of FIG. 5. The projection 44 in the housing 13 secures the position of the profiled metal plate 4.

FIG. 7 shows a bearing of a selector fork 3 upon a longitudinal guide 2 with rollers 42 which are held upon bolts 40. The profiled metal plate 4 meshes with positive fit in a lug 15 on the selector fork. The projection 44 on the housing 13 delimits the radial freedom of movement of the profiled metal plate 4 and thus contributes to the reliable support of the profiled metal plate.

FIG. 8 shows the selector fork of FIG. 7 along a section C—C upon a longitudinal guide 2 of triangular profile. The guidance of the selector fork 3 upon the longitudinal guide 2 is here provided in three rollers 42 supported upon bolts 40. The profiled metal plate 4 meshes in the selector fork 3.

In FIGS. 9 and 10 is shown another possibility of transmission of the shifting force by profiled metal plates. To transmit the shifting force, in each selector fork 3 a profiled metal plate 4, 5, 6 is plugged with positive fit in a lug 15 of the selector forks 3 and thereby is also prevented from wandering out. Due to the closely concentrated housing part 13, it is possible advantageously to obtain in addition on the projections 44 a security and guidance in their position of the profiled metal plates. The profiled metal plate 5 is here designed with two parts. The two parts of the profiled metal plate 5 communicate by connecting elements 30 which penetrate in the profiled metal plate 4 through longitudinal holes.

With the device proposed the selection, shifting and locking of the gear shift are centered on a central point. The position of the point on the housing is to a great extent determined by the shape of the profiled metal plates. As shown in FIG. 1, if the switching comb 7 is fastened upon the longitudinal guide 2, the machining operations on the housing 12, 13 are minimized. The complete gear shift system can be assembled, adjusted and tested as module. Due to the simplicity of the shifting connection, it is likewise possible as finished modules to attach other selector units such as lever shifts for right-hand and left-hand steering vehicles, cable-controlled and hydrostatic shift mechanisms and devices for automatic transmissions.

In pinion gear change transmissions known already, the indication and locking functions such as R-gear indication, neutral position are as a rule placed on the housing and actuated by the selector forks or selector rails. The invention proposes to shift all indications in the selector unit in order to reduce tolerance problems, obtain an easy assembly of the transmission and prevent on the transmission variants due to customer's desires. The problem of switch damage during transportation and assembly of the vehicle is eliminated. The unitary connection offers a simple interface for selector units and allows both using the same selector units for transmissions of different sizes and also using different selector units like lever shifts and turning shaft controls for right-hand and left-hand steering vehicles in the same transmission. The connection can also be very advantageously used for cable-controlled and hydrostatic mechanisms. For automation modules a very favorable unitary connection results. In addition become possible a clear separation of the structural parts needed for the pinion gear change transmissions and all shifting parts connected with the selector units.

What is claimed is:

1. A shifting mechanism (1) for pinion gear change transmissions having housing parts (12, 13) for transmitting a gate selection and gear shifting from one manual shift lever or one selector unit (14), the movements of which are transmitted via shifting means (10) to a shifting finger (9), which effects the selection of the desired gate and the desired gear, to selector forks (3, 21) for actuating the selected gear and having automatic locking devices (16) for blocking the non-selected gates and gears, wherein all selector forks (3, 21) are guided by means of a longitudinal guide (2) firmly connected with said housing parts (12, 13) and which slide on said guide actuated by profiled metal plates (4, 5, 6) which by one end slide in a switching comb (7) fastened on said longitudinal guide (2) and having as teeth locking plates (11) between which said shifting finger (9) and said automatic locking devices (16) are moved by said shifting means (10) to interact with one of said profiled metal plate (4, 5, 6) for shifting the gears and block said locking plates (11) for the non-selected gates and gears.

2. The shifting device (1) according to claim 1, wherein said longitudinal guide (2) has a profile in the shape of a triangle and said profile consists of a steel pipe.

3. The shifting device (1) according to claim 1, wherein said selector forks (3, 21) are made of one of a die-cast aluminum and compound material and a guide bearing is integrated directly in said selector forks (3, 21) and engaging the longitudinal guide.

4. The shifting device (1) according to claim 1, wherein said selector forks (3, 21) include low-friction bearings.

5. The shifting device (1) according to claim 1, wherein said selector forks (3, 21) have rollers (42) as a longitudinal guide mechanism.

6. The shifting device (1) according to claim 1, wherein said profiled metal plates (4, 5, 6) are fixed in a shifting direction with said selector forks (3, 21) by means of driver pins (22) and the position of said profiled metal plates (4, 5, 6) in a selecting direction is determined by means of spacer discs (23, 24).

7. The shifting device (1) according to claim 1, wherein said profiled metal plates (4, 5, 6) are connected by a positive fit with said selector forks (3, 21) by means of lugs (15), and a position of said selector forks in a selecting direction is obtained by curves and passages of said profiled metal plates (4, 5, 6).

8. The shifting device (1) according to claim 1, wherein said selector forks (21) have, beneath said longitudinal guide (2), pockets (20) in which engage levers (19) supported in said longitudinal guide (2), an end of which levers mesh in pockets (18) of said profiled metal plates (4, 5, 6) to reverse the movement of said profiled metal plates (4, 5, 6).

9. The shifting device according to claim 1, wherein said switching comb (7) in a selecting direction is formed alternatively by locking plates (11) and profiled metal plates (4, 5, 6) fixed in the selecting direction and in which pockets (17) are placed through which said shifting finger (9) and said automatic locking device (16) slide in the selecting direction.

* * * * *